(12) United States Patent
Yuan et al.

(10) Patent No.: US 11,881,042 B2
(45) Date of Patent: Jan. 23, 2024

(54) SEMANTIC TEMPLATE MATCHING

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Li Juan Gao, Xi'an (CN); Peng HuangFu, Xi'an (CN); Si Heng Sun, Xi'an (CN); Yi Chen Zhong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 17/537,559

(22) Filed: Nov. 30, 2021

(65) Prior Publication Data

US 2023/0169786 A1 Jun. 1, 2023

(51) Int. Cl.
*G06V 30/00* (2022.01)
*G06V 30/412* (2022.01)
(Continued)

(52) U.S. Cl.
CPC ........... *G06V 30/412* (2022.01); *G06N 3/045* (2023.01); *G06T 7/73* (2017.01); *G06V 10/36* (2022.01); *G06V 10/82* (2022.01); *G06V 30/1448* (2022.01); *G06V 30/1468* (2022.01); *G06V 30/19007* (2022.01); *G06V 30/19127* (2022.01); *G06V 30/19147* (2022.01);
(Continued)

(58) Field of Classification Search
CPC .......... G06N 3/045; G06T 2207/20081; G06T 2207/20084; G06T 7/73; G06T 7/11; G06T 7/70; G06T 2207/30176; G06V 30/10; G06V 10/25; G06V 10/82; G06V 30/414; G06V 30/412; G06V 30/40; G06V 30/416; G06V 30/418; G06V 10/46; G06V 30/148; G06V 30/158; G06V 30/153; G06V 30/1448; G06F 40/279; G06F 18/24147; G06F 40/242; G06F 16/5846
See application file for complete search history.

(56) References Cited

U.S. PATENT DOCUMENTS 8,571,317 B2  10/2013  Welling et al.
8,977,057 B1  3/2015  Smith
(Continued)

FOREIGN PATENT DOCUMENTS

CN    10296827 A      3/2013
CN    102567764 B     3/2016
DE    112018005418 T5 7/2020

OTHER PUBLICATIONS

Cosine similarity—Wikipedia (Year: 2023).*
(Continued)

*Primary Examiner* — Ping Y Hsieh
*Assistant Examiner* — Xiao Liu
(74) *Attorney, Agent, or Firm* — Schmeiser, Olsen & Watts, LLP; Edward Wixted

(57) ABSTRACT

A system and method for field extraction including determining a key position of a key in an electronic file, isolating candidate key values based on a distance from the key position, selecting a key value from the candidate key values based on an output of a trained neural network, and extracting the key and the key value from the electronic file, regardless of a key-value structure.

20 Claims, 16 Drawing Sheets

(51) Int. Cl.
*G06V 10/82* (2022.01)
*G06V 30/414* (2022.01)
*G06V 30/14* (2022.01)
*G06V 30/146* (2022.01)
*G06V 30/19* (2022.01)
*G06T 7/73* (2017.01)
*G06V 10/36* (2022.01)
*G06N 3/045* (2023.01)

(52) U.S. Cl.
CPC .. *G06V 30/414* (2022.01); *G06T 2207/20081* (2013.01); *G06T 2207/20084* (2013.01); *G06T 2207/30176* (2013.01)

(56) References Cited

U.S. PATENT DOCUMENTS 10,878,234 B1  12/2020  Adam et al.
10,896,357 B1*  1/2021  Corcoran ............ G06F 18/217
2019/0065840 A1  2/2019  Saxena et al.
2019/0171873 A1  6/2019  Northrup et al.
2019/0251422 A1*  8/2019  Ramanath ......... G06F 16/24578
2022/0215195 A1*  7/2022  Gao .................... G06V 30/416

OTHER PUBLICATIONS

Mell, Peter et al.; "The NIST Definition of Cloud Computing;" National Institute of Standards and Technology; Special Publication 800-145; Sep. 2011; 7 pages.

Authors: NA, System and Method for Data Extraction from Complex Tables in Scanned Documents, https://priorart.ip.com/IPCOM/000264851. Published In: An IP.com Prior Art Database Technical Disclosure, Publication Date: Jan. 31, 2021, 9 pages.

Tim Cheng, Title: How to extract Key-Value pairs from Documents using deep learning, https://nanonets.com/blog/key-value-pair-extraction-from-documents-using-ocr-and-deep-learning/, Published In: Nanonets.com Publication Date: May 23, 2021, 22 pages.

* cited by examiner

Name:    xxxxxx xxxxxxx xxxxxx         xxx

Address:    1223xxxx xxx         xxxx xxx

Date Received:         xxxx xxx
            xxx

Reason for Ticket:
                    xxxxxxxxxxx xxxxxxx  xxxxxxxxx xxxxxxx    xxxxxxxxxxx xxxxxxxxxxx xxxxxxxxxxxx            xxxxxxxxx

Name: xxxxxx xxxxxxx xxxxxx  xxx

Address: 1223xxxx xxx    xxxx xxx

Date Received: xxxx xxx    xxx

Reason for Ticket:    xxxxxxxxxxx xxxxxxxx  xxxxxxxxx xxxxxxx    xxxxxxxxxxx xxxxxxxxxxx xxxxxxxxxxxxx    xxxxxxxxx

SEMANTIC TEMPLATE MATCHING

BACKGROUND

Field extraction is difficult when a key-value structure varies across different templates.

SUMMARY

An embodiment of the present invention relates to a method, and associated computer system and computer program product for field extraction. A processor of a computing system determines a key position of a key in an electronic file. Candidate key values are isolated based on a distance from the key position. A key value is selected from the candidate key values based on an output of a trained neural network. The key and the key value are extracted from the electronic file.

BRIEF DESCRIPTION OF THE DRAWINGS

FIG. 3 depicts an exemplary embodiment of a file having keys and values that are to be extracted in accordance with embodiments of the present invention.

FIG. 4 depicts the file of FIG. 3 with bounding boxes around the text, in accordance with embodiments of the present invention.

FIG. 5 depicts an example of identifying coordinates of a bounding box labeled on the file of FIG. 4, in accordance with embodiments of the present invention.

DETAILED DESCRIPTION

Figure 1:
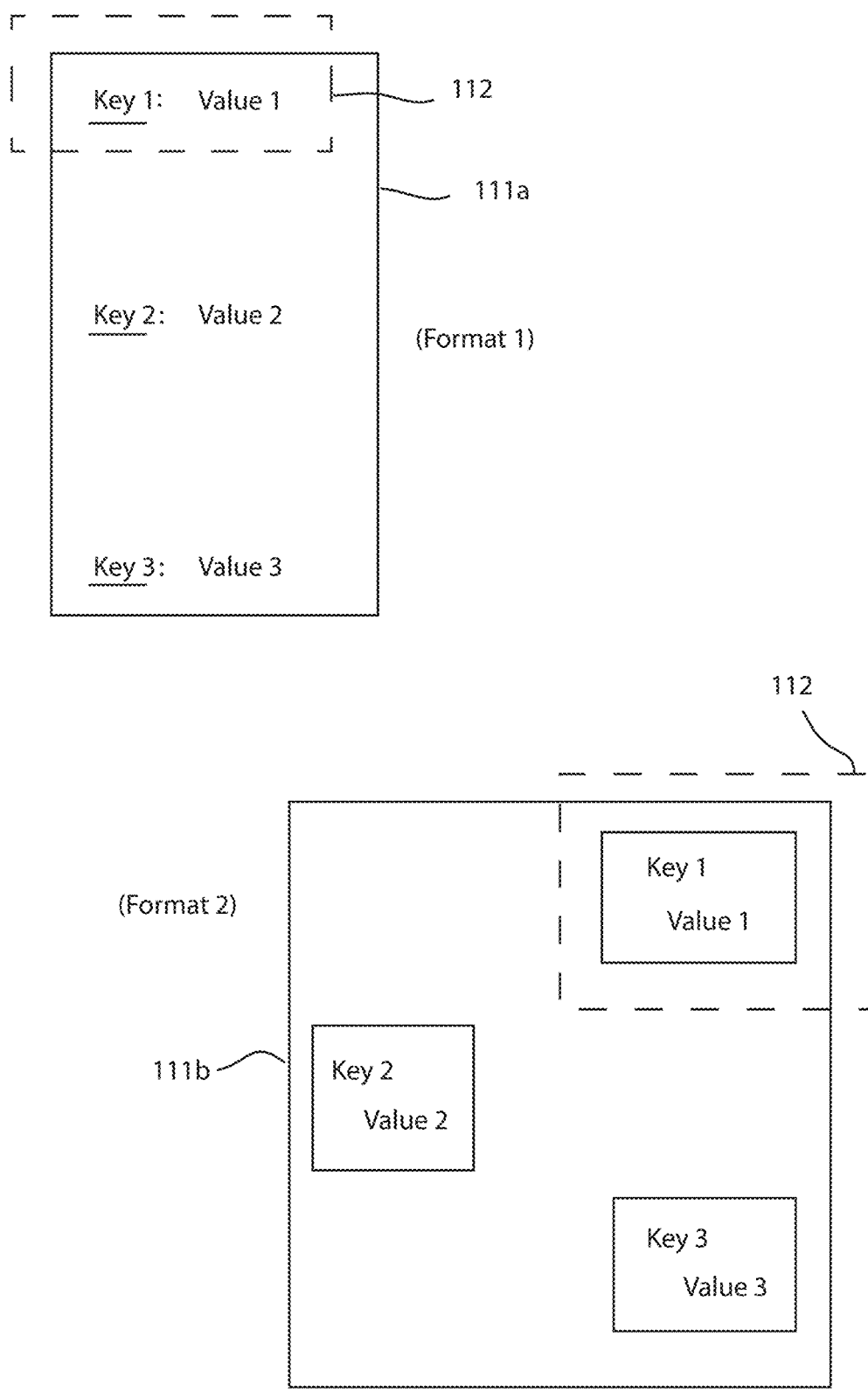
FIG. 1 depicts an example of two files that have two different layouts.

Field extraction in smart workflow optical character recognition ("OCR") projects conventionally use an alignment correction technology to correct different layouts to a similar posture to be recognized and adjust a preset location area. The text is extracted by OCR and the fields are extracted. The pre-set location area is called the OCR template. However, in actual projects, there are often many layout formats of the same type of document/file, which requires a manual customization of templates. FIG. 1 depicts two files 111a, 111b having two different formats (format 1) and (format 2). As shown in FIG. 1, the fields contained in the two file (i.e. "Key 1", "Key 2", "Key 3", "Value 1", "Value 2", "Value 3") are exactly the same, but because the templates corresponding to the two files are different, the key-value structures 112 (i.e. position of the value relative to key) are different. As a result, a single template cannot be reused for field extraction of documents/files having different key-structures 112. To parse files with different key-structures 112, a template for each file must be re-customized, or all the text has to be parsed out all the texts and then processed by natural language processing ("NLP") for post-processing. Both re-customizing the template or parsing the text and using NLP for post-processing have drawbacks; the former method consumes a lot of labor resources while the latter method results in lower accuracy during field extraction. Thus, there is a need for dynamic template generation for field extraction operations.

In brief overview, embodiments of the present invention improve field extraction of files having a different key-value structure, which avoids the need to rely on conventional methods of customizing a new template for each key-value structure. To allow for template matching for field extraction, embodiments of the present invention use multi-modal distance from key positions and leverage a neural network to select the correct value associated with the key out of a number of candidate values present in the file. The neural network is trained by feeding keys and values into the neural network to learn what values match with specific keys and what values do not match with the key. Based on the output of the neural network, the key and the correct value can be automatically and accurately extracted from the file regardless of the key-value structure of the file.

The proposed method can be based on the characteristics of the file. In the file (e.g. a bill), although the content of a value is not certain, a content of Key typically does not change drastically as the template layouts change. For example, a key "application time" can have different semantics in the same bill under different templates but likely has the same meaning in multiple layout formats. As the essence of the bills of different templates is still the key-value structure, a relative position of key and value may change with different templates, such as changing from the upper and lower structure to a left and right structure, or a diagonal structure. However, due to a relevance of key and value and the necessary legibility of the bill itself, the relative distance between the two is very similar in most cases. As shown in FIG. 1 in layout format 1, the value is in the first position to the right of the key. In layout format 2, the value is in the first position below and diagonal to the key.

Therefore, constraints are made on the semantic properties of the key when customizing the template, and the semantic invariance of the key can be used to determine the position of the key. The position of the key is used as the center to find several candidate text areas that are relatively close to each other. A Siamese Network or other neural network is used to train a semantic related sorting algorithm of the key and the value in advance. The candidate areas are ranked/sorted using the outputs of the neural network to find the correct value corresponding to the key regardless if the key-value structure is different than a previous file undergoing field extraction.

Figure 2:
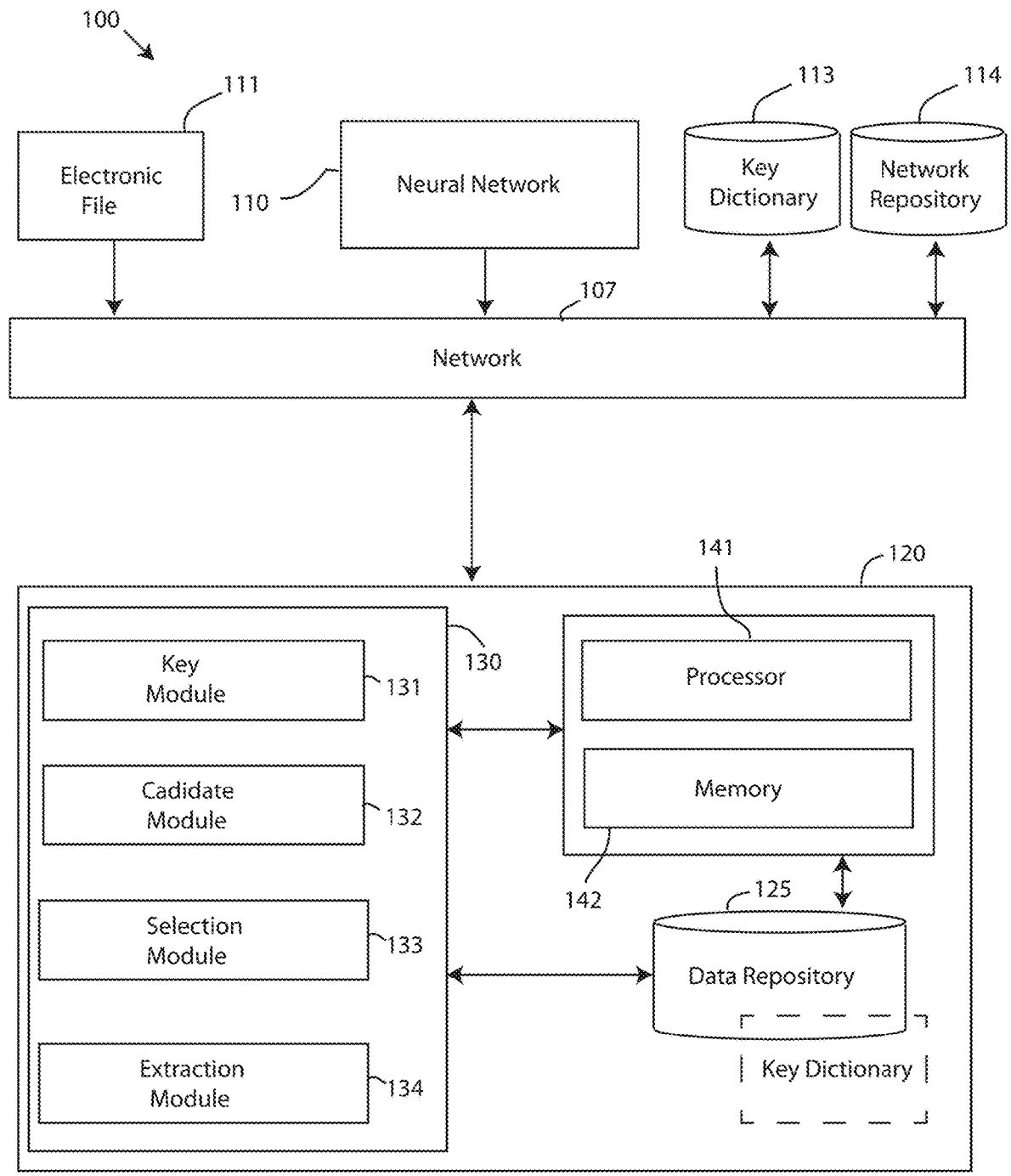
FIG. 2 depicts a block diagram of field extraction system, in accordance with embodiments of the present invention.

FIG. 2 depicts a block diagram of a field extraction system 100, in accordance with embodiments of the present invention. The field extraction system 100 is a system for template matching during field extraction operations. The field extraction system 100 may be useful for extracting key and values from multiple files that have different layouts and key-value structures.

The field extraction system 100 includes a computing system 120. Embodiments of the computing system 120 include a computer system, a computer, a server, one or more servers, a backend computing system, and the like.

Furthermore, the field extraction system 100 includes a neural 110, such as a Siamese Network, that is communicatively coupled to the computing system 120 over a network 107. For instance, information/data, such as text associated with a key and a plurality of key values, is transmitted to and/or received from the neural network 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture. In alternative embodiment, the neural network is a part of the computing system 120. The data output by the neural network 110 is transmitted to the computing system 120 via data bus lines connected to the processor 141 of the computing system 120.

In an exemplary embodiment, the network 107 further comprises, in addition to the computing system 120, a connection to one or more network-accessible knowledge bases 114, which are network repositories containing information relating to templates, key-value structures, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the key-value structures of templates, past templates, and the like, to generate both historical and predictive reports regarding a particular template or key-value structure. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The computing system 120 is configured to perform field extraction of the keys and associated values of an electronic file 111. The electronic file 111 is an electronic document, such as a scanned image, a pdf, an image, a bill, an invoice, a ticket, and the like, that contains text. The text within the file 111 are keys and values and potentially other information that a user may want to automatically extract from the file 111 and enter into a database, a template, a server, the cloud, etc. The files 111 can be stored in a remote database and accessible over network 107 and/or can be stored locally on the computing system 120 in a data repository 125. As an example, the files 111 can be hundreds or even thousands of invoices, bills, tickets, images, records, or any information-containing document.

The neural network 110 is a tool for selecting a correct value(s) for a specific key within the file 111, which is then extracted by the computing system 120. The neural network 110 can be comprised of two identical networks, such as a Siamese Network, or other convolutional neural network that provides an output to a received input. To improve field extraction of files having various key-value structures, the field extraction system 100 leverages the trained neural network 110 to determine which candidate key value has a highest degree of matching with the key; the candidate key value with the highest degree of matching with the key is selected as the key value.

The computing system 120 also includes a key dictionary 113. The key dictionary 113 is a database or repository that stores keys and the key's semantic matches. If a key is extracted from the file 111, the key dictionary 113 is accessed to confirm that the conditions of semantic matching are met, and that the extracted key corresponds to a key that has been previously fed into the neural network 110 during training of the neural network 110. Information/data, such as text associated with a key and a plurality of key values, is transmitted to and/or received from the key dictionary 113 over a network 107. In alternative embodiment, the key dictionary 113 is a part of the computing system 120, and the results from querying the key dictionary 113 is transmitted to the computing system 120 via data bus lines connected to the processor 141 of the computing system 120.

Referring still to FIG. 2, the computing system 120 of the field extraction system 100 is equipped with a memory device 142 which stores various data/information/code, and a processor 141 for implementing the tasks associated with the field extraction system 100. A field extraction application 130 is loaded in the memory device 142 of the computing system 120. The field extraction application 130 performs field extraction to files 111 using the neural network 110. The field extraction application 130 can be an interface, an application, a program, a module, or a combination of modules. In an exemplary embodiment, the field extraction application 130 is a software application running on one or more back end servers (e.g. computing system 120).

The field extraction application 130 of the computing system 120 includes a ley module 131, a candidate module 132, a selection module 133, and an extraction module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The key module 131 includes one or more components of hardware and/or software program code for determining, a key position of a key in an electronic file 111. The key position is a location (e.g. coordinates) of a specific key on the file 111. Most files contain a plurality of keys and the key module 131 determines the key position of all the keys contained within the file 111. In some embodiments, it is possible that key module 131 is programmed to ignore certain keys or target specific keys within the file 111. The key module 131 thus determines the key positions of the keys for extraction. FIG. 3 depicts an exemplary embodiment of a file 111 having keys and values that are to be extracted in accordance with embodiments of the present invention. As shown in FIG. 3, the file 111 contains the keys "Name", "Address", "Date Received", and "Reason For Ticket." These keys are located in different locations of the file 111, and the key module 131 determines the position of these keys to create a reference point for isolating/finding candidate values that are associated with these keys.

To determine the key position, the key module 131 performs an optical character recognition of the electronic file 111 to extract a text at a specific position of the electronic file 111. In an exemplary embodiment, the key module 131 performs an OCR on the entire file to locate positions of the text included in the file 111. The OCR operation is not simply extracting the file 111 into a whole paragraph of text but extracting the text at different positions. Alternatively, the key module 131 can sequentially perform OCR on the file. The key module 131 labels or annotates the electronic file 111 by creating a bounding box around the extracted text at the positions of the text. FIG. 4 depicts the electronic file 111 of FIG. 3 with bounding boxes around the text, in accordance with embodiments of the present invention. Bounding boxes can be labeled using an annotator or similar software tool. Once the file 111 has been labeled with the bounding boxes, the key module 131 identifies the coordinates of the bounding boxes. The key module 131 may identify the coordinates for all of the bounding boxes annotated on the file, or may target bounding boxes located in a general region of the file, such as the top half of the file, bottom half of the file, upper right, upper left, etc. to limit the scope of the field extraction operation of many files.

Figure 5:
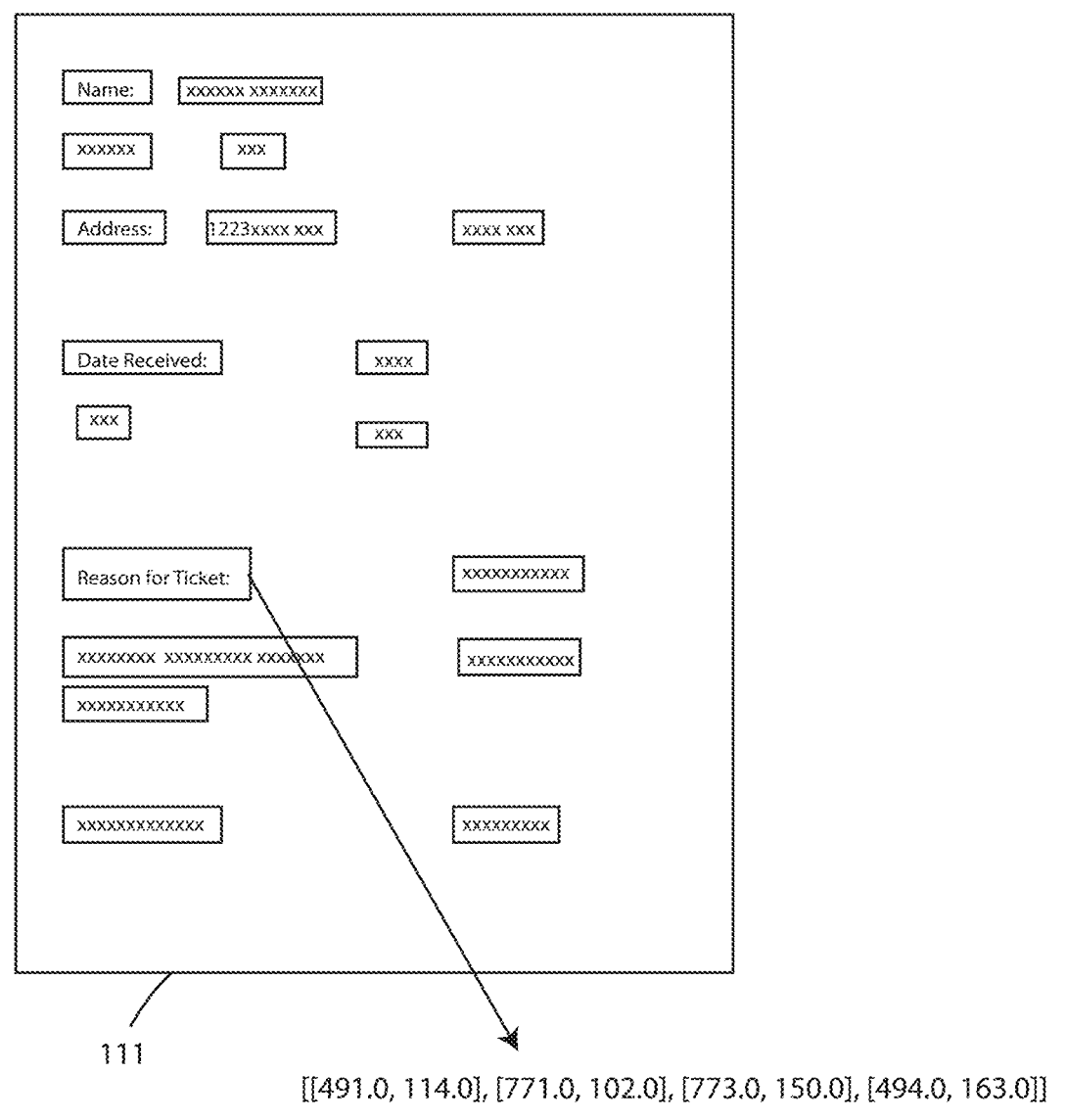

Using the key "Reasons for Ticket" as an example, the key module 131 learns the text content within the bounding box surrounding as a function of the OCR. The key module 131 then determines the coordinates of the four corners of the bounding box. FIG. 5 depicts an example of identifying coordinates of a bounding box labeled on the file of FIG. 4, in accordance with embodiments of the present invention. In the illustrated embodiment, the coordinates of the bounding box associated with "Reasons for Ticket" is [[491.0, 114.0], [771.0, 102.0], [773.0, 150.0], [494.0, 163.0]]. Knowing the coordinates of the bounding box, the key module 131 calculates a center of the bounding box for use as a reference point when searching for candidate value bounding boxes, as described below.

Figure 6:
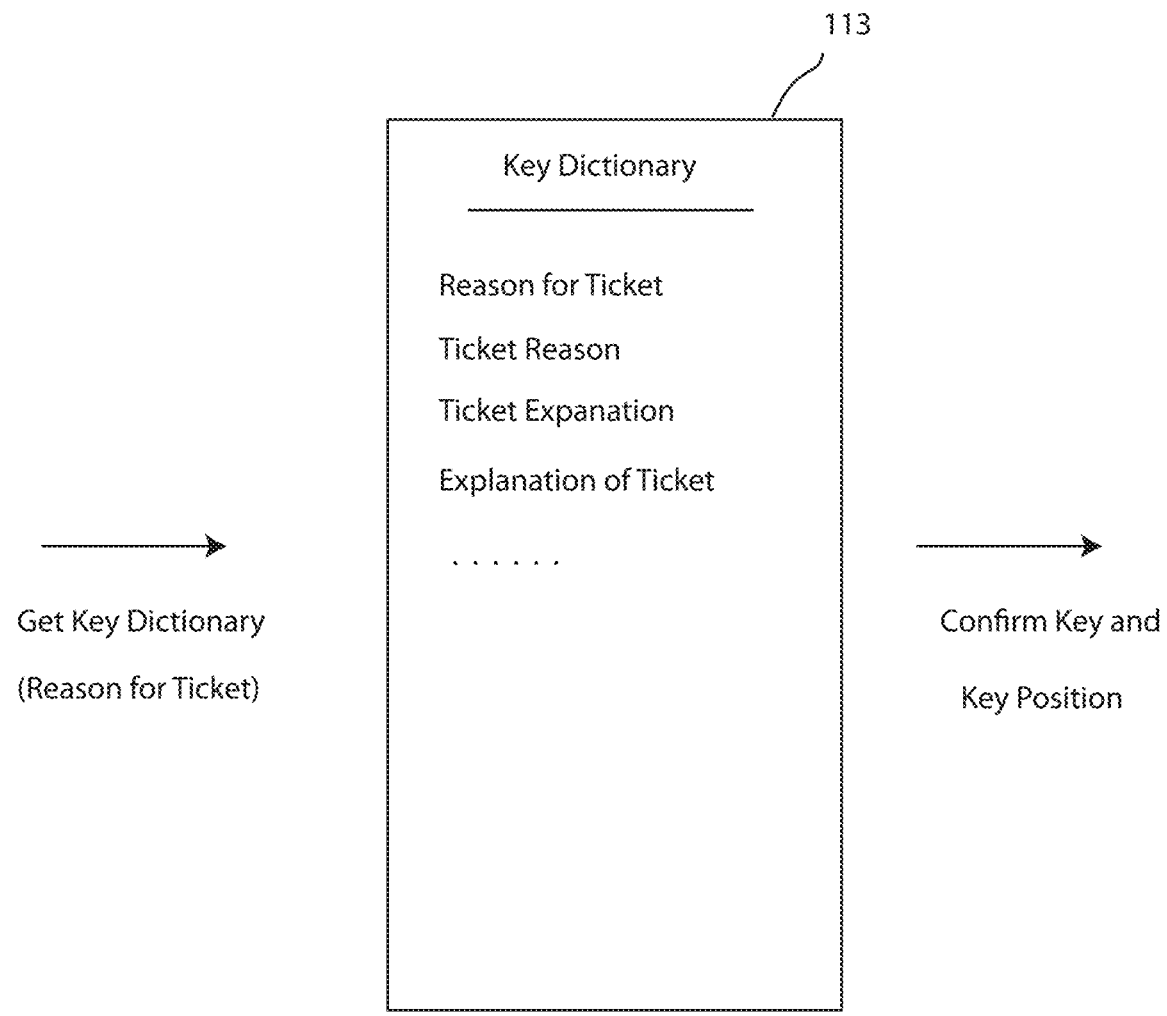
FIG. 6 depicts a block diagram of the semantic matching function for key and key position verification, in accordance with embodiments of the present invention.

Moreover, the key module 131 performs a semantic matching of the text extracted for each key to determine if the conditions for semantic matching are met to verify the key and confirm the key position, as shown in FIG. 6. For instance, the key module 131 looks up the text of the key (e.g. "Reason for Ticket") in the key dictionary 113. The key dictionary 113 contains several words that semantically match (i.e. have the same meaning) with the extracted key. Additionally, the words contained in the key dictionary 113 can be semantically matching words that have been input the neural network 110 during training of the neural network 110. As shown in FIG. 6, the key "Reason for Ticket" is present in the key dictionary 113 so the key module 113 can confirm the key and the key position for "Reason for Ticket." If the file 111 would have instead had the text "Ticket Explanation" or "Ticket Reason," the key module 131 could likewise verify the semantic match and confirmed the key and the key position because the conditions for semantic matching are met in this example. However, if the key module 131 looked up an unrelated word then the key module 131 could not verify the semantic match using the key dictionary 113. The semantic matching method can utilize multiple methods such as edit distance, word embedding, etc. to verify the key and key position.

The candidate module 132 includes one or more components of hardware and/or software program code for isolating candidate key values based on a distance from the key position. For instance, after determining the key position, the candidate module 132 isolates, identifies, determines, etc. candidate key values using a location of the key position within the file 111 as a reference point to search and identify candidate key values. In an exemplary embodiment, the candidate module 132 searches for bounding boxes near a center position of the bounding box surrounding the key. The search for bounding boxes near the key position includes looking for the nearest bounding box in the three directions to the right, down, and bottom right (the choice of these three directions is due to the writing habits of files and generally layout formats; however, all directions, including above the key position can be searched). The absolute distance from the center of the bounding box of the key can be used as a measurement scale or a relative position ranking of the bounding box can be used as the measurement scale. Through this method of measurement, several candidate bounding boxes closest to the bounding box of the key are identified as a candidate area of the value corresponding to this key. When the candidate area is determined, the position information may no longer be considered in the next steps.

Figure 7:
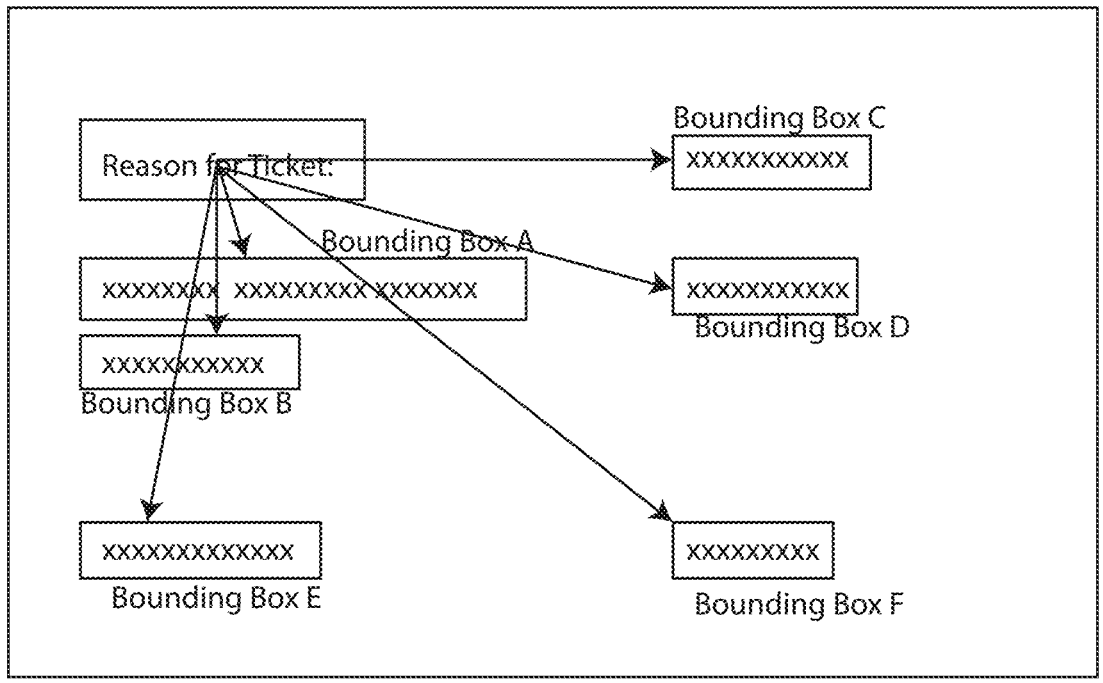
FIG. 7 depicts an example of isolating candidate key values by locating the nearest bounding boxes surrounding text that have the potential to be value associated with the key, in accordance with embodiments of the present invention.

FIG. 7 depicts an example of isolating candidate key values by locating the nearest bounding boxes surrounding text that have the potential to be value associated with the key, in accordance with embodiments of the present invention. Using the same key "Reason for Ticket" as an example, the candidate module 132 measures the distance from the center of the bounding box at the key position to bounding boxes located nearest the key position in at least three directions. There are no bounding boxes to the left of the key position. Below the key position bounding box is "Bounding Box A", which is 60 pixels from the center of the key position, "Bounding Box B", which is 85 pixels from the center of the key position, and "Bounding E," which is 130 pixels from the center of the bounding box. To the right of the key position, there is "Bounding Box C," which is 90 pixels from the center of the key position. To the right and below (diagonal from the key position, there is "Bounding Box D", which is 100 pixels from the center of the key position, and "Bounding Box F," which is 160 pixels from the center of the key position. Bounding Boxes "A-F" are considered to be candidate bounding boxes and each include a text ("xxxxxx . . . ") extracted as a function of the OCR performed by the key module 131; each text or group of text within the candidate bounding boxes are considered to be candidate key values because the text could be value associated with the key "Reason for Ticket."

Figure 8:
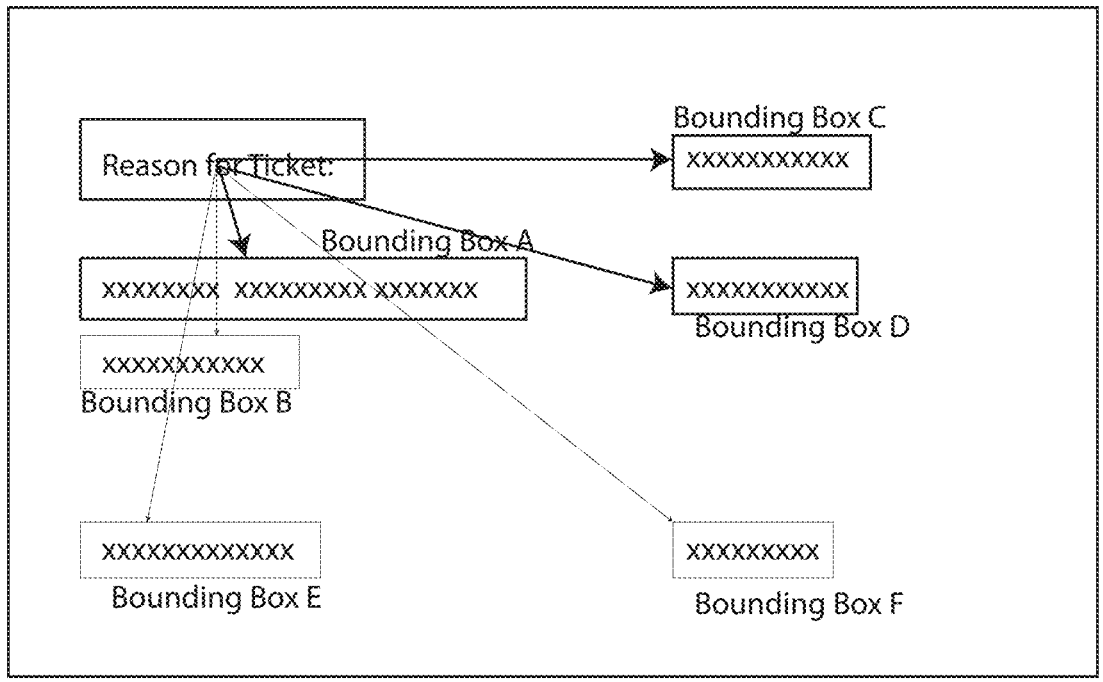
FIG. 8 depicts an example of filtering candidate bounding boxes of FIG. 7, in accordance with embodiments of the present invention.

The candidate module 132 optionally filters the candidate bounding boxes to reduce a number of the candidate bounding boxes, which leads to faster field extraction, less consumption of network resources and processing power, and reduced throughput of the neural network 110. The filtering is based on a relative position of the candidate bounding boxes with respect to the key position. For example, if three candidate bounding boxes are located below the key position, it is likely that the two lowest candidate bounding boxes do not contain the candidate value because the likelihood that the key value would be located two or three lines of text below the key position is very low. FIG. 8 depicts an example of filtering the candidate bounding boxes of FIG. 7, in accordance with embodiments of the present invention. In the illustrated embodiment, "Bounding Box B" and "Bounding Box E" are eliminated as candidate bounding boxes (shown in FIG. 6 with arrows having a smaller line weight) because "Bounding Box A" is far more likely to contain the key value than "Bounding Box B" and "Bounding Box E" due to the position of "Bounding Box A" being directly above and closer to the key position. Likewise, "Bounding Box F" is eliminated as a candidate bounding box because "Bounding Box C" and "Bounding Box D" are far more likely to contain the key value than "Bounding Box F" due to the position of "Bounding Box C" and "Bounding Box D" being directly above and closer to the key position. Thus, in the example illustrated in FIG. 8, the candidate bounding boxes after filtering are "Bounding Box A", "Bounding Box C", and "Bounding Box D."

Figure 9:
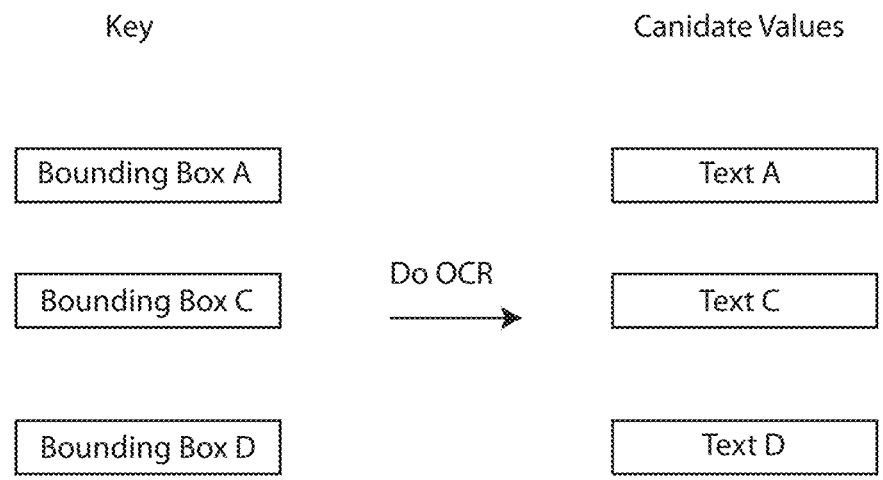
FIG. 9 depicts text extraction from the candidate bounding boxes filtered in FIG. 8, in accordance with embodiments of the present invention.

Once the candidate bounding boxes are determined and/or isolated, the candidate module 132 extracts or processes a text contained within the candidate bounding boxes using OCR methods. As shown in FIG. 9, "Bounding Box A" contains candidate key value "Text A", "Bounding Box C" contains candidate key value "Text C", and "Bounding Box D" contains the candidate key value "Text D." One of "Text A", "Text C", and "Text D" is the correct key value for the key "Reason for Ticket." Embodiments of the present invention leverages a trained neural network to determine which of the candidate key values is the correct key value.

Figure 10:
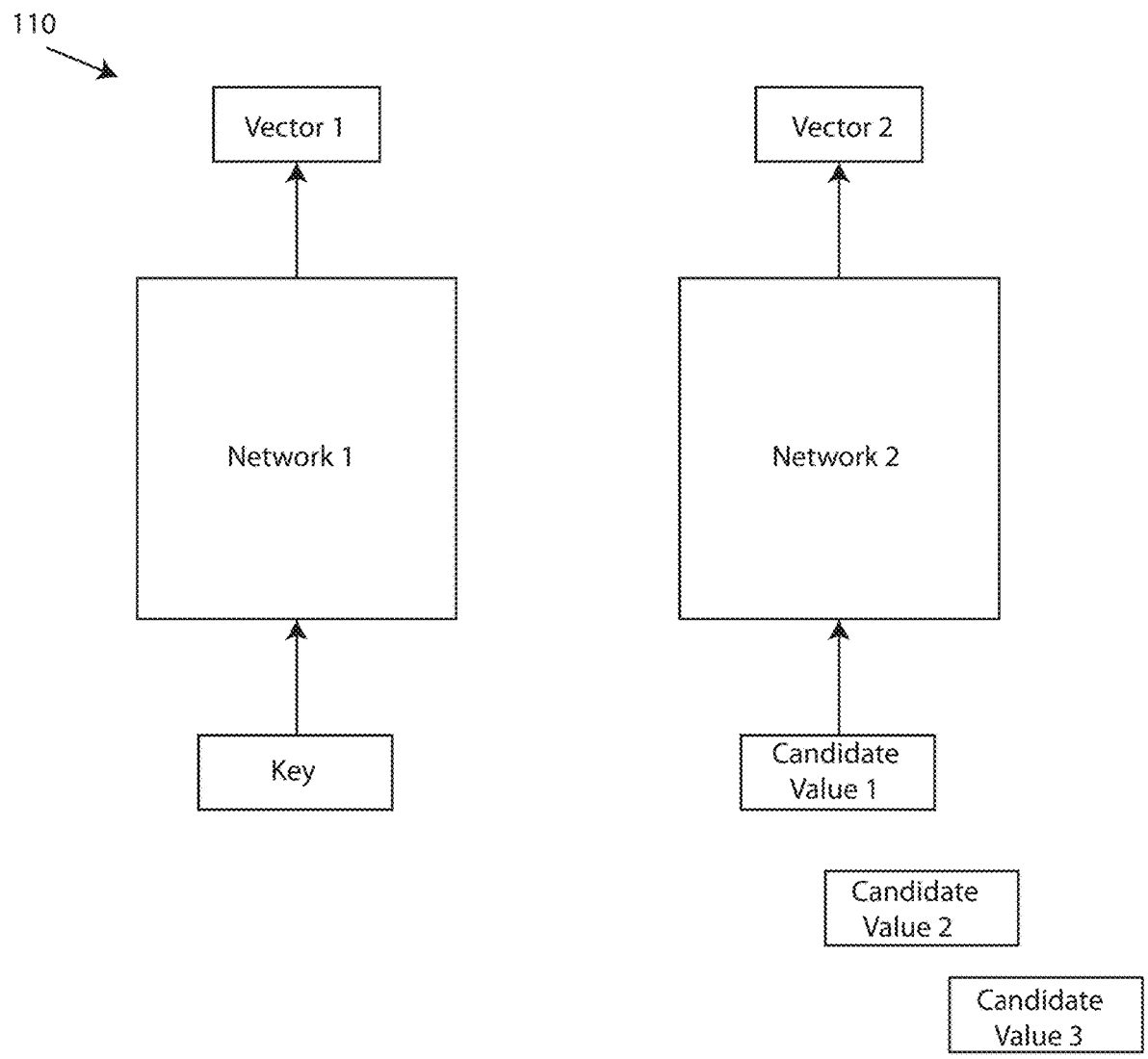
FIG. 10 depicts a block diagram of the neural network used to determine the correct key value, in accordance with embodiments of the present invention.

Referring back to FIG. 2, the selection module 133 includes one or more components of hardware and/or software program code for selecting a key value from the candidate key values based on an output of a trained neural network 110. The selection module 133 leverages the trained neural network 110 to determine which candidate key value has a highest degree of matching with the key; the candidate key value with the highest degree of matching with the key is selected as the key value. FIG. 10 depicts a block diagram of the neural network 110 used to determine the correct key value, in accordance with embodiments of the present invention. In the illustrated embodiment, the neural network 110 is a Siamese Network comprising two identical networks, Network 1 and Network 2. The key ("Reason for Ticket" is fed into Network 1 and a first key value ("Candidate Value 1"—"Text A") of the candidate key values is fed into Network 2. Network 1 outputs a vector, Vector 1, and Network 2 outputs a vector, Vector 2. The cosine similarity function of Vector 1 and Vector 2 results in a first output being a number (e.g. 0.8) representing a degree of matching between the key and the first key value. Next, the key ("Reason for Ticket" is fed into Network 1 and a second key value ("Candidate Value 2"—"Text C") of the candidate key values is fed into Network 2. Network 1 outputs a vector, Vector 1, and Network 2 outputs a vector, Vector 2. The cosine similarity function of Vector 1 and Vector 2 results in a second output being a number (e.g. 0.4) representing a degree of matching between the key and the second key value. Next, the key ("Reason for Ticket" is fed into Network 1 and a third key value ("Candidate Value 3"—"Text D") of the candidate key values is fed into Network 2. Network 1 outputs a vector, Vector 1, and Network 2 outputs a vector, Vector 2. The cosine similarity function of Vector 1 and Vector 2 results in a third output being a number (e.g. 0.3) representing a degree of matching between the key and the third key value. Finally, the selection module 133 ranks the first key value, the second key value, and the third key value based on a highest degree of matching with the key. The highest degree of matching with the key is the number closest to 1, which in the illustrated embodiments is "Text A contained in Bounding Box A."

The example used herein contains three candidate key values which are fed into the trained neural network 110. However, there may be less than three or more than three candidate key values that are fed into the trained neural network 110, each input resulting in an output of the trained neural network, which can be ranked according to embodiments of the present invention.

Figure 11:
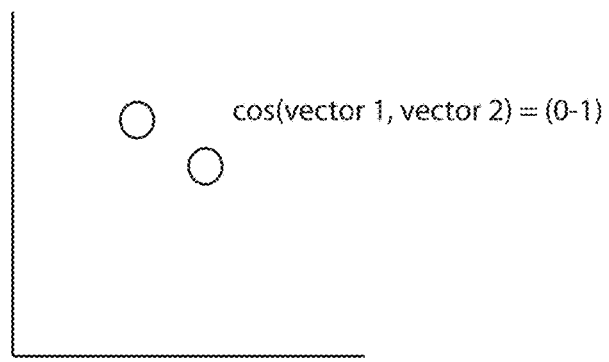
FIG. 11 depicts a two-dimensional map of output vectors of the neural network, in accordance with embodiments of the present invention.

The neural network 110 is trained prior to the operation of the field extraction application 130. The neural network 110 is trained by feeding a first input sample and a second input sample into two neural networks to obtain a first vector and a second vector. The first input sample is a sample key and the second input sample is a sample value. The first vector and the second vector are mapped into a two-dimensional space, as shown in FIG. 11. A number between 0 and 1 is calculated using a cosine similarity function of the first vector and the second vector. The number closer to 1 indicates a match between the sample key and the sample value, and the number closer to 0 indicates that the sample value does not match with the sample key.

In an exemplary embodiment, a semantic matching model of a Siamese network is pre-trained. The matching model enters positive and negative samples of a key and value into the encoder code respectively (e.g. Input1 and Input2), and feeds the two input feeds into two neural networks (Network1 and Network2) that share weights. Each input is mapped to the new space to form a representation of the input in the new space. Through the calculation of Loss, the similarity of the two inputs can be evaluated. The matching key and value input pairs are positive samples, and the unmatched key and value input pairs are negative samples. The matching model trained in this way can take the key and the candidate value as the input of the model, and get a score ranging from 0 to 1. The closer the score is to 1, the higher the matching degree between the key and the subsequent value.

Referring back to FIG. 2, the extraction module 134 of the computing system 120 includes one or more components of hardware and/or software program code for extracting the key and the key value from the electronic file 111. The key and the key value can be loaded into a new template, stored in a database, populated into a different electronic file and the like.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the field extraction system 100 improves field extraction operations by training and leveraging a neural network to extract key and value information from electronic files regardless of layout and/or key-value structure. The trained neural network infers the correct key value from candidate key values selected based on multi-modal distances. The field extraction system 100 is therefore compatible with electronic files/templates of various layouts without the need for building a custom template for each different key-value structure, saving time and computer resources. By training a Siamese Network with the field extraction system 100 and using multi-modal distances from key positions on the document, key values are accurately and quickly extracted from document regardless of the layout of the document. Improved key-value extraction results in improved field extraction efficiency and accuracy.

Figure 12:
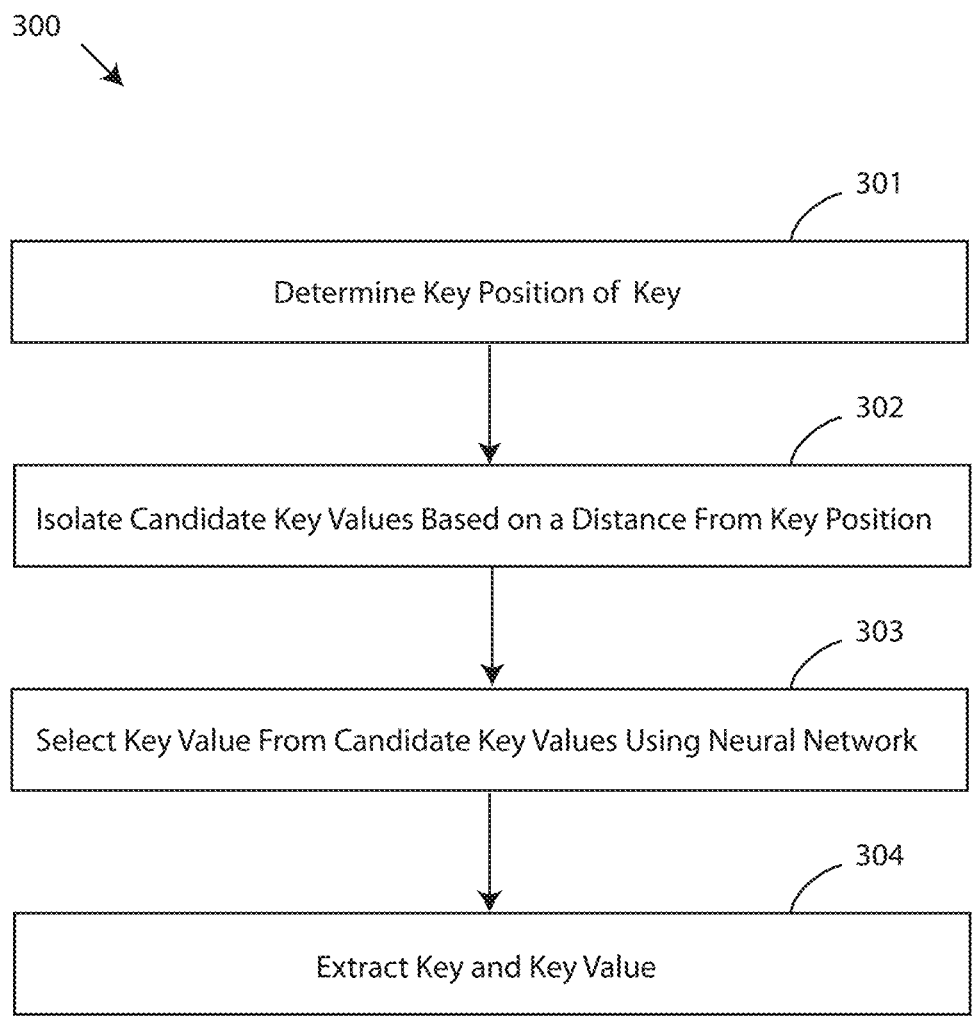
FIG. 12 depicts a flow chart of a method 300 for field extraction, in accordance with embodiments of the present invention.

Referring now to FIG. 12, which depicts a flow chart of a method 300 for field extraction, in accordance with embodiments of the present invention. One embodiment of a method 300 or algorithm that may be implemented for field extraction with the field extraction system 100 described in FIGS. 2-11 using one or more computer systems as defined generically in FIG. 16 below, and more specifically by the specific embodiments of FIG. 2.

Embodiments of the method 300 for field extraction, in accordance with embodiments of the present invention, may begin at step 301 wherein step 301 determines a key position of a key. Step 302 isolates or otherwise identifies candidate key values based on a distance from the key position. Step 303 selects the key value associated with the key from the candidate values using a trained neural network. Step 304 extracts the key and the key value.

Figure 13:
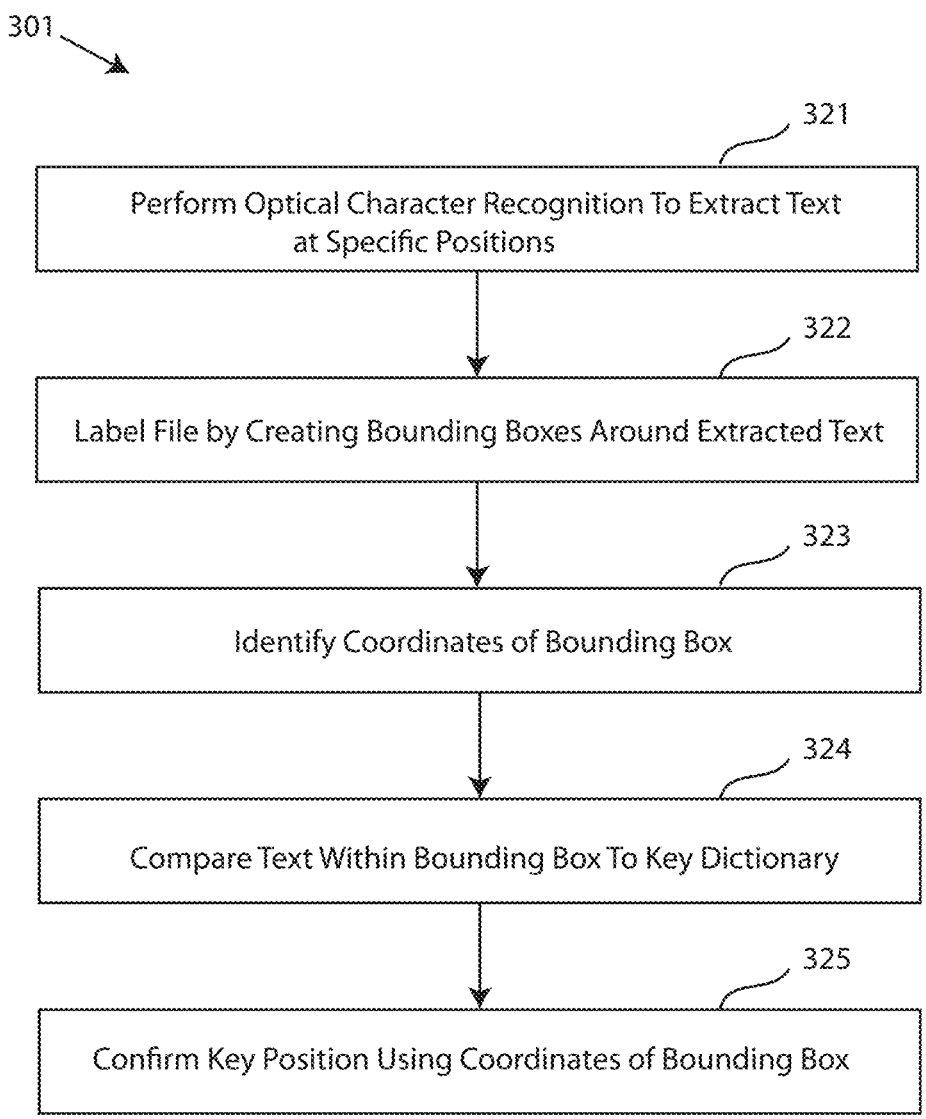
FIG. 13 depicts a flow chart of a step of the method for field extraction, in accordance with embodiments of the present invention.

FIG. 13 depicts a flow chart of step 301 of the method for field extraction, in accordance with embodiments of the present invention. To determine a key position of a key, step 321 performs OCR to extract text at specific positions. Step 322 labels/annotates the electronic file by creating bounding boxes around the extracted text. Step 323 identifies the coordinates of the bounding boxes. Step 324 compares the text within the bounding boxes to the key dictionary to verify semantic conditions are met. Step 325 confirms the key position as the coordinates of the bounding box.

Figure 14:
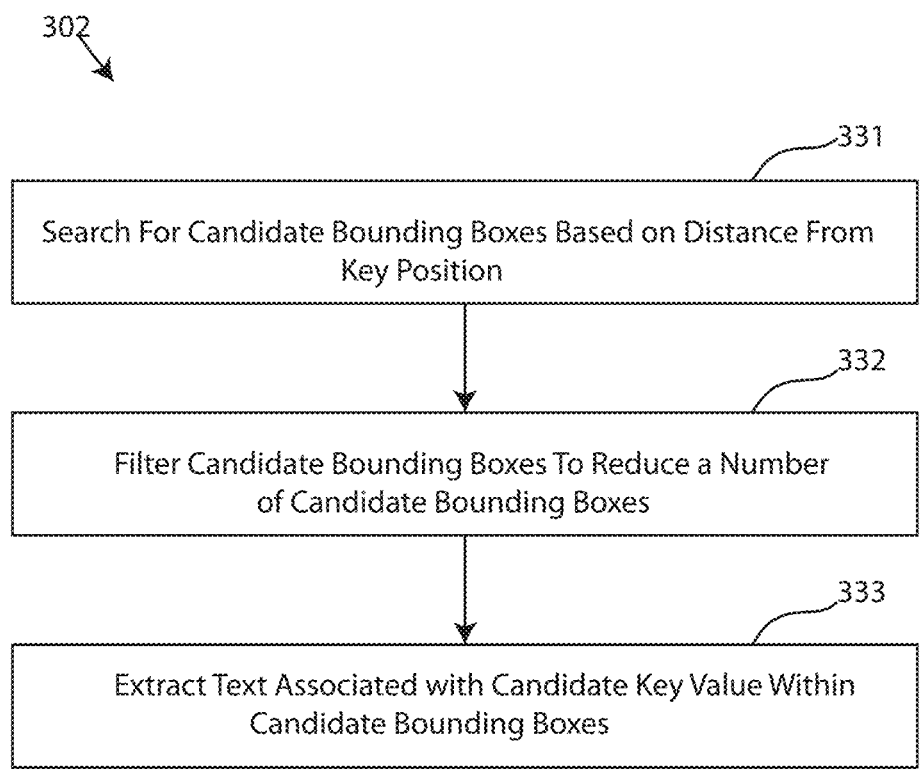
FIG. 14 depicts a flow chart of another step of the method for field extraction, in accordance with embodiments of the present invention.

FIG. 14 depicts a flow chart of another step of the method for field extraction, in accordance with embodiments of the present invention. To isolates or otherwise identify candidate key values based on a distance from the key position, step 331 searches for candidate bounding boxes based on a distance from the key position (e.g. center of bounding box of key). Step 332 filters the candidate bounding boxes to reduce a number of candidate bounding boxes. Step 333 extracts text associated with the candidate key values within the candidate bounding boxes.

Figure 15:
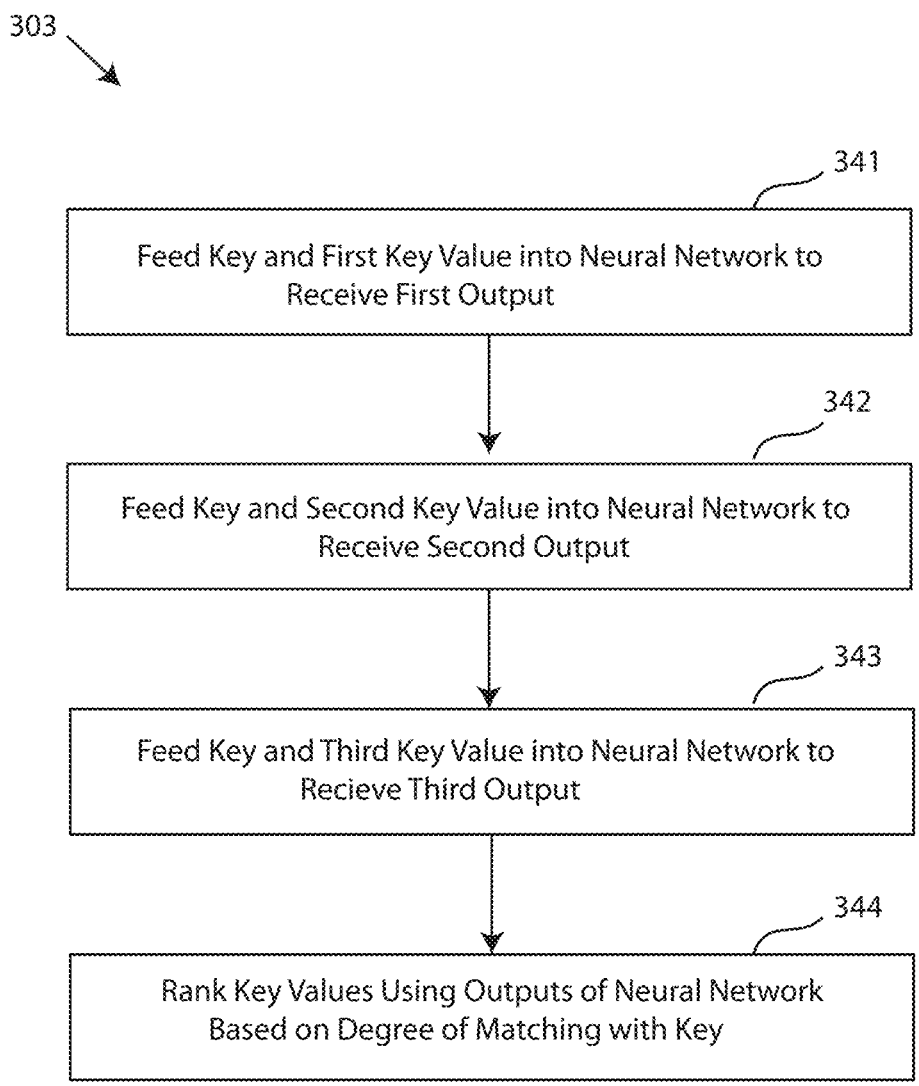
FIG. 15 depicts a flow chart of another step of the method for field extraction, in accordance with embodiments of the present invention.

FIG. 15 depicts a flow chart of another step of the method for field extraction, in accordance with embodiments of the present invention. To select the key value associated with the key from the candidate values using a trained neural network, step 341 feeds the key and the first key value into the neural network to receive a first output. Step 342 feeds the key and the second key value into the neural network to receive a second output. Step 343 feeds the key and the third key value into the neural network to receive a third output. Step 344 ranks the key values using the outputs of the trained neural network, which is based on the degree of matching with the key.

Figure 16:
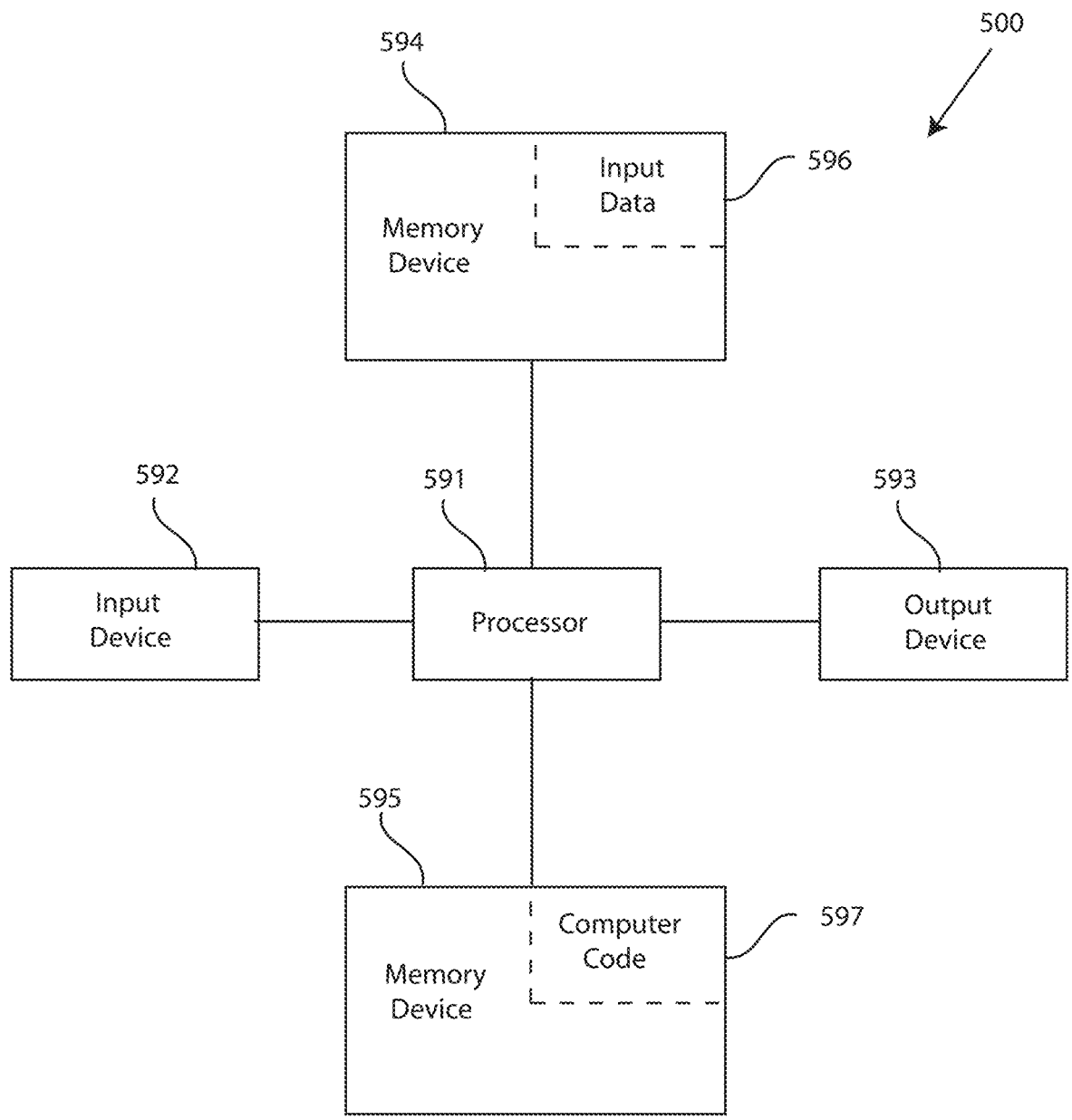
FIG. 16 depicts a block diagram of a computer system for field extraction of FIGS. 2-11, capable of implementing a method for field extraction of FIG. 12, in accordance with embodiments of the present invention.

FIG. 16 depicts a block diagram of a computer system for the field extraction system 100 of FIGS. 2-11, capable of implementing methods for field extraction of FIG. 12, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for field extraction in the manner prescribed using the field extraction system 100 of FIGS. 2-11, wherein the instructions of the computer code 597 may be executed by processor 591 via memory device 595. The computer code 597 may include software or program instructions that may implement one or more algorithms for implementing the method for field extraction, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 16.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to automatically classifying compartments at a security checkpoint. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to extract key and key values. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for field extraction. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for field extraction.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
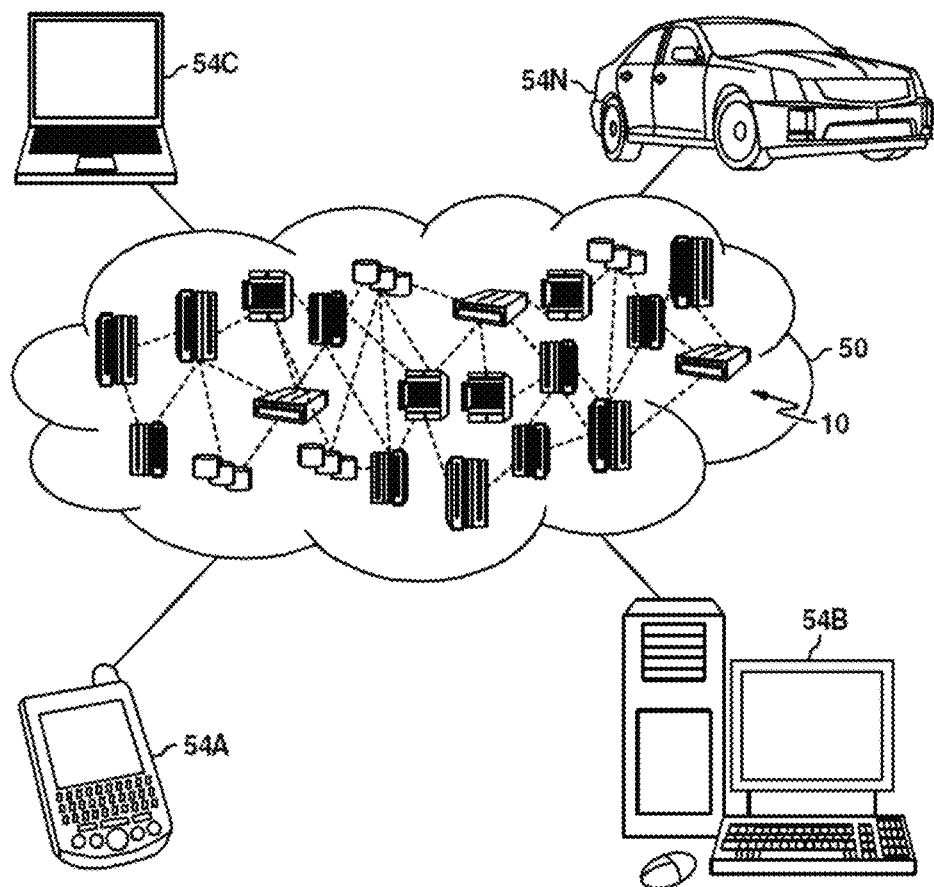
FIG. 17 depicts a cloud computing environment, in accordance with embodiments of the present invention.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 15 are intended to be illustrative only and that computing nodes 10 and cloud computing environment 50 can communicate with any type of computerized device over any type of network and/or network addressable connection (e.g., using a web browser).

Figure 18:
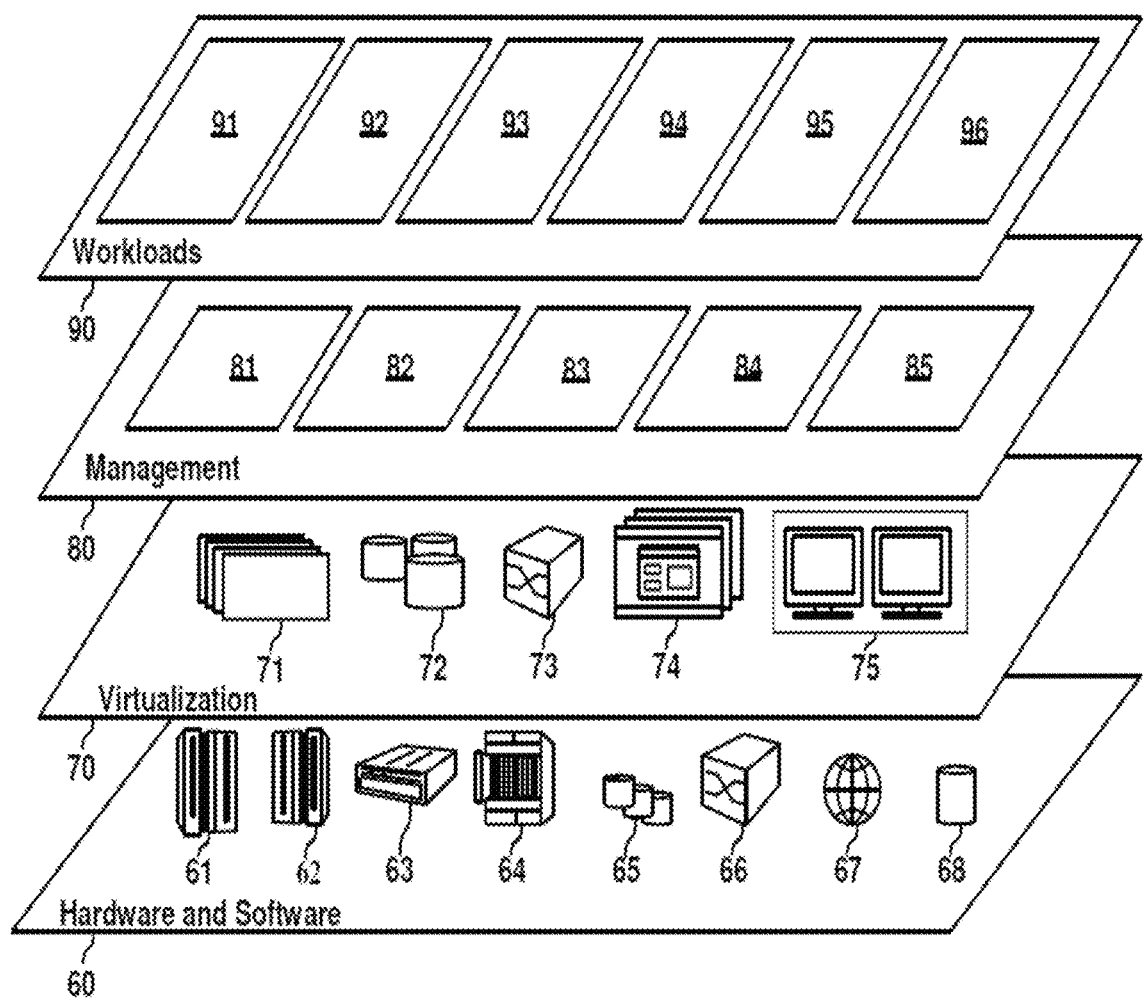
FIG. 18 depicts abstraction model layers, in accordance with embodiments of the present invention.

Referring now to FIG. 18 a set of functional abstraction layers provided by cloud computing environment 50 (see FIG. 17) are shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and field extraction 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  determining, by a processor of a computing system, a key position of a key in an electronic file;
  isolating, by the processor, candidate key values based on a distance from the key position measured in at least three directions, wherein the isolating includes:
    searching for candidate bounding boxes that contain the candidate key values based on the distance from the key position, and
    filtering the candidate bounding boxes based on a relative position of a candidate bounding box with respect to the key position and other candidate bounding boxes;
  selecting, by the processor, a key value from the candidate key values based on an output of a trained neural network; and extracting, by the processor, the key and the key value from the electronic file.

2. The method of claim 1, wherein determining the key position comprises:
performing, by the processor, an optical character recognition of the electronic file to extract a text at a specific position of the electronic file;
labeling, by the processor, the electronic file by creating a bounding box around the text at the specific position; and
identifying, by the processor, coordinates of the bounding box.

3. The method of claim 2, further comprising:
comparing, by the processor, the text within the bounding box to a key dictionary to verify that the text is the key; and
confirming, by the processor, the key position of the key using the coordinates of the bounding box.

4. The method of claim 1, wherein the filtering reduces a total number of candidate bounding boxes, and the isolating further includes
extracting, by the processor, a text associated with the candidate key values contained within the candidate bounding boxes.

5. The method of claim 1, wherein the selecting the key value from the candidate key values comprises:
leveraging, by the processor, the trained neural network to determine which candidate key value has a highest degree of matching with the key, wherein the candidate key value with the highest degree of matching with the key is selected as the key value.

6. The method of claim 5, wherein the leveraging the trained neural network comprises:
first feeding, by the processor, the key and a first key value of the candidate key values into the trained neural network to receive a first output, the first output being a number representing a degree of matching between the key and the first key value;
second feeding, by the processor, the key and a second key value of the candidate key values into the trained neural network to receive a second output, the second output being a number representing a degree of matching between the key and the second key value;
third feeding, by the processor, the key and a third key value of the candidate key values into the trained neural network to receive a second output, the second output being a number representing a degree of matching between the key and the second key value; and
ranking, by the processor, the first key value, the second key value, and the third key value based on a highest degree of matching with the key.

7. The method of claim 1, wherein the trained neural network is a Siamese Network.

8. The method of claim 1, wherein the trained neural network is trained by:
feeding a first input sample and a second input sample into two neural networks to obtain a first vector and a second vector, wherein the first input sample is a sample key and the second input sample is a sample value;
mapping the first vector and the second vector into a two-dimensional space; and
calculating a number between 0 and 1 using a cosine similarity function of the first vector and the second vector;
wherein the number closer to 1 indicates a match between the sample key and the sample value, and the number closer to 0 indicates that the sample value does not match with the sample key.

9. A computing system, comprising:
a processor;
a memory device coupled to the processor; and
a computer readable storage device coupled to the processor, wherein the storage device contains program code executable by the processor via the memory device to implement a method comprising:
determining, by the processor, a key position of a key in an electronic file;
isolating, by the processor, candidate key values based on a distance from the key position measured in at least three directions, wherein the isolating includes:
searching for candidate bounding boxes that contain the candidate key values based on the distance from the key position, and
filtering the candidate bounding boxes based on a relative position of a candidate bounding box with respect to the key position and other candidate bounding boxes;
selecting, by the processor, a key value from the candidate key values based on an output of a trained neural network; and
extracting, by the processor, the key and the key value from the electronic file.

10. The computing system of claim 9, wherein determining the key position comprises:
performing, by the processor, an optical character recognition of the electronic file to extract a text at a specific position of the electronic file;
labeling, by the processor, the electronic file by creating a bounding box around the text at the specific position; and
identifying, by the processor, coordinates of the bounding box.

11. The computing system of claim 10, further comprising:
comparing, by the processor, the text within the bounding box to a key dictionary to verify that the text is the key; and
confirming, by the processor, the key position of the key using the coordinates of the bounding box.

12. The computing system of claim 9, wherein the filtering reduces a total number of candidate bounding boxes, and the isolating further includes
extracting, by the processor, a text associated with the candidate key values contained within the candidate bounding boxes.

13. The computing system of claim 9, wherein the selecting the key value from the candidate key values comprises:
leveraging, by the processor, the trained neural network to determine which candidate key value has a highest degree of matching with the key, wherein the candidate key value with the highest degree of matching with the key is selected as the key value.

14. The computing system of claim 9, wherein the leveraging the trained neural network comprises:
first feeding, by the processor, the key and a first key value of the candidate key values into the trained neural network to receive a first output, the first output being a number representing a degree of matching between the key and the first key value;
second feeding, by the processor, the key and a second key value of the candidate key values into the trained neural network to receive a second output, the second output being a number representing a degree of matching between the key and the second key value;
third feeding, by the processor, the key and a third key value of the candidate key values into the trained neural network to receive a second output, the second output being a number representing a degree of matching between the key and the second key value; and
ranking, by the processor, the first key value, the second key value, and the third key value based on a highest degree of matching with the key.

15. The computing system of claim 9, wherein the trained neural network is a Siamese Network.

16. The computing system of claim 9, wherein the trained neural network is trained by:
feeding a first input sample and a second input sample into two neural networks to obtain a first vector and a second vector, wherein the first input sample is a sample key and the second input sample is a sample value;
mapping the first vector and the second vector into a two-dimensional space; and
calculating a number between 0 and 1 using a cosine similarity function of the first vector and the second vector;
wherein the number closer to 1 indicates a match between the sample key and the sample value, and the number closer to 0 indicates that the sample value does not match with the sample key.

17. A computer program product, comprising a computer readable hardware storage device storing a computer readable program code, the computer readable program code comprising an algorithm that when executed by a computer processor of a computing system implements a method comprising:
determining, by the processor, a key position of a key in an electronic file;
isolating, by the processor, candidate key values based on a distance from the key position measured in at least three directions, wherein the isolating includes:
searching for candidate bounding boxes that contain the candidate key values based on the distance from the key position, and
filtering the candidate bounding boxes based on a relative position of a candidate bounding box with respect to the key position and other candidate bounding boxes;
selecting, by the processor, a key value from the candidate key values based on an output of a trained neural network; and
extracting, by the processor, the key and the key value from the electronic file.

18. The computer program product of claim 17, wherein determining the key position comprises:
performing, by the processor, an optical character recognition of the electronic file to extract a text at a specific position of the electronic file;
labeling, by the processor, the electronic file by creating a bounding box around the text at the specific position;
identifying, by the processor, coordinates of the bounding box;
comparing, by the processor, the text within the bounding box to a key dictionary to verify that the text is the key; and
confirming, by the processor, the key position of the key using the coordinates of the bounding box.

19. The computer program product of claim 17, wherein the leveraging the trained neural network comprises:
first feeding, by the processor, the key and a first key value of the candidate key values into the trained neural network to receive a first output, the first output being a number representing a degree of matching between the key and the first key value;
second feeding, by the processor, the key and a second key value of the candidate key values into the trained neural network to receive a second output, the second output being a number representing a degree of matching between the key and the second key value;
third feeding, by the processor, the key and a third key value of the candidate key values into the trained neural network to receive a second output, the second output being a number representing a degree of matching between the key and the second key value; and
ranking, by the processor, the first key value, the second key value, and the third key value based on a highest degree of matching with the key.

20. The computer program product of claim 17, wherein the trained neural network is trained by:
feeding a first input sample and a second input sample into two neural networks to obtain a first vector and a second vector, wherein the first input sample is a sample key and the second input sample is a sample value;
mapping the first vector and the second vector into a two-dimensional space; and
calculating a number between 0 and 1 using a cosine similarity function of the first vector and the second vector;
wherein the number closer to 1 indicates a match between the sample key and the sample value, and the number closer to 0 indicates that the sample value does not match with the sample key.

* * * * *